(12) United States Patent
Sarkar (10) Patent No.: US 11,764,977 B2
(45) Date of Patent: Sep. 19, 2023

(54) PRIVATE KEY SECURITY IN THE CLOUD

(71) Applicant: The Boeing Company, Chicago, IL (US)

(72) Inventor: Joydeep Sarkar, West Bengal (IN)

(73) Assignee: THE BOEING COMPANY, Arlington, VA (US)

( * ) Notice: Subject to any disclaimer, the term of this patent is extended or adjusted under 35 U.S.C. 154(b) by 348 days.

(21) Appl. No.: 17/220,333

(22) Filed: Apr. 1, 2021

(65) Prior Publication Data
US 2022/0020003 A1 Jan. 20, 2022

(30) Foreign Application Priority Data

Jul. 18, 2020 (IN) .............................. 202011030708

(51) Int. Cl.
*H04L 9/32* (2006.01)
*H04L 9/08* (2006.01)
(Continued)

(52) U.S. Cl.
CPC .......... *H04L 9/3265* (2013.01); *G06F 16/182* (2019.01); *G06Q 20/3674* (2013.01);
(Continued)

(58) Field of Classification Search
CPC ... H04L 9/3265; H04L 9/0825; H04L 9/3218; H04L 9/3221; H04L 2209/42;
(Continued)

(56) References Cited

U.S. PATENT DOCUMENTS

2014/0359289 A1* 12/2014 Camenisch ........... H04W 12/02
 713/168
2020/0021438 A1* 1/2020 Gasparini ............. G06F 16/907

FOREIGN PATENT DOCUMENTS

WO 2014-096325 A1 6/2014

OTHER PUBLICATIONS

"Hsm Commands," downloaded on Apr. 1, 2021 at https://cloudhsm-safenet-docs.s3.amazonaws.com/007-011136-002_lunasa_5-1_webhelp_rev-a/Content/reference/hsm_command_menu.htm, (date unknown) 1 page.

(Continued)

*Primary Examiner* — Catherine Thiaw
*Assistant Examiner* — Hany S. Gadalla
(74) *Attorney, Agent, or Firm* — MH2 Technology Law Group LLP (57) ABSTRACT

Techniques for providing to a user with an anonymous user signature on a message in a distributed decentralized network are presented. The techniques use a hardware security module and a certificate authority. The certificate authority: obtains a credential that includes a certificate for the user, where the certificate includes a user public key and a plurality of user attributes; receives a request for a signature on the message, where the request includes an indication of a subset of the plurality of user attributes to be revealed; accesses from the hardware security module a user secret key; and provides to the user at least the message signed by the user secret key and a zero-knowledge proof that establishes that the message is signed by the user secret key corresponding to the user public key in the credential without revealing the plurality of user attributes.

20 Claims, 4 Drawing Sheets

(51) Int. Cl.
*G06Q 20/36* (2012.01)
*G06F 16/182* (2019.01)

(52) U.S. Cl.
CPC .......... *H04L 9/0825* (2013.01); *H04L 9/3218* (2013.01); *H04L 9/3221* (2013.01)

(58) Field of Classification Search
CPC ..... H04L 9/0897; H04L 9/321; H04L 9/3247; G06F 16/182; G06Q 20/3674; G06Q 20/38215; G06Q 20/3829; G06Q 20/4014
See application file for complete search history.

(56) References Cited

OTHER PUBLICATIONS

OpenDNSSEC, "SoftHSM," downloaded on Apr. 1, 2021, at https://www.opendnssec.org/softhsm/ (date unknown) 1 page.

Ranganathaiah, "Creating key pair using java library and storing it in SoftHSM token," downloaded on Apr. 1, 2021, at https://wiki.onap.org/display/DW/Creating+key+pair+using+java+library+and+storing+it+in+SoftHSM+token, last modified Mar. 30, 2018, 2 pages.

"Hyperledger membership service provider (MSP) implementation with identify mixer," downloaded on Apr. 1, 2021 at, https://hyperledger-fabric.readthedocs.io/en/release-1.1/idemix.html, (date unknown) 8 pages.

"Using a hardware security module (HSM)," downloaded on Apr. 1, 2021, at https://hyperledger-fabric.readthedocs.io/en/latest/hsm.html, (date unknown) 5 pages.

"MSP Implementation with identify mixer," downloaded on Apr. 1, 2021, at https://hyperledger-fabric.readthedocs.io/en/release-1.2/idemix.html, (date unknown) 8 pages.

"IBM Identity mixer," downloaded on Apr. 1, 2021, at https://www.zurich.ibm.com/pdf/csc/Identity_Mixer_Nov_2015.pdf, (date unknown) 2 pages.

"Hyperledger/fabric-sdk-java," downloaded on Apr. 1, 2021, at https://github.com/hyperledger/fabric-sdk-java/blob/master/src/main/java/org/hyperledger/fabric/sdk/idemix/IdemixSignature.java (date unknown) 9 pages.

"Apache milagro crypto library (AMCL)," downloaded on Apr. 1, 2021, at https://milagro.apache.org/docs/amcl-overview.html (date unknown) 10 pages.

Bogatov et al., "Anonymous transactions with revocation and auditing in hyperledger fabric," downloaded on Apr. 1, 2021, at https://eprint.iacr.org/2019/1097.pdf (2019) 18 pages.

Camenisch et al., "Anonymous Attestation Using the Strong Diffie Hellman Assumption Revisted," downloaded on Apr. 1, 2021, at https://eprint.iacr.org/2016/663.pdf, (2016) 65 pages.

* cited by examiner

PRIVATE KEY SECURITY IN THE CLOUD

RELATED APPLICATION

This application claims priority to, and the benefit of, India patent application number 202011030708, filed Jul. 18, 2020, and entitled, "Private Key Security in the Cloud".

FIELD

This disclosure relates to asymmetric cryptography and distributed decentralized networks, such as blockchain networks.

BACKGROUND

"Asymmetric cryptography" refers to cryptography that utilizes a "key pair" consisting of a "public key" and a "private key". Data, such as a message, may be encrypted by applying an encryption algorithm that uses the one of these keys to a message, and encrypted data may be decrypted by applying a corresponding decryption algorithm that uses the other of these keys. Asymmetric cryptography includes such well-known algorithms as the Rivest-Shamir-Adleman (RSA) technique, as well as the Diffie-Hellman family of techniques.

A digital signature, or simply "signature", is typically the result of encrypting a message (or a hash thereof) using a private key of an asymmetric cryptographic key pair. The corresponding public key is published or otherwise made available by the signing entity to the verifying party. A validating party can validate the signature on the user's signed message by applying the user's public key to the signature and comparing the result to the object or the hash of the object, or otherwise by determining that the signature corresponds to the object or its hash, depending on the scheme. If the comparison results in a match, then the signature is valid; otherwise it is invalid.

A user's public key may be made publicly available in a certificate signed by a trusted entity such as a certificate authority, for example. Such a certificate may include a copy of the user's public key and a plurality of attributes of the associated user, such as the user's name and contact information.

Blockchain technology records transactions in an immutable, trustworthy and decentralized manner. Digital signatures are important for blockchains. Because blockchain interactions typically cross secure perimeters of organizations and user domains, the secrecy of private keys for generating digital signatures needs to be protected.

There is no standard technique for securing private keys in a distributed and decentralized network such as a blockchain network. Existing solutions tend to not be specific to distributed and decentralized systems. Further, there is no known solution for keeping blockchain user's identities and their attributes completely secret and anonymous during a transaction, particularly during the consensus stage.

SUMMARY

According to various examples, a method of a certificate providing to a user an anonymous user signature on a message in a distributed decentralized network is presented. The method includes: obtaining, by the certificate authority, a credential for the user, the credential comprising a certificate signed by a root certificate authority on the network, wherein the certificate comprises a user public key and a plurality of user attributes; receiving, by a certificate authority on the network and from the user, a request for a signature on the message, wherein the request comprises the message to be signed and an indication of a subset of the plurality of user attributes to be revealed to a recipient; accessing, from a hardware security module on the network, a user secret key corresponding to the user public key in the credential; and providing, by the certificate authority and to the user, at least the message signed by the user secret key and a zero-knowledge proof, wherein the zero-knowledge proof establishes that the message is signed by the user secret key corresponding to the user public key in the credential without revealing the plurality of user attributes, whereby the user sends the subset of user attributes, the zero-knowledge proof, and the message signed by the user secret key corresponding to the user pubic key in the credential to the recipient, who confirms at least that the message is signed by the user secret key corresponding to the user public key in the credential without obtaining the plurality of user attributes.

Various optional features of the above examples include the following. The method may include, prior to the receiving the request for the signature: receiving, by a certificate authority on the network and from the user, a request for an account; and providing, to the user, a user name and a password. The method may include, prior to the receiving the request for the signature: generating an asymmetric cryptographic key pair for the user, wherein the asymmetric cryptographic key pair consists of the user public key and the user secret key; and installing the user secret key in the hardware security module. The method may include providing to the user an identification of a memory location of the hardware security module at which the user secret key is stored. The network may include a blockchain network. The message may include a proposed cryptocurrency transaction in the blockchain network. The method may include, prior to the receiving the request for the signature: accessing, from the hardware security module, the user secret key; and generating, using the user secret key, the credential for the user. The hardware security module may be protected by at least one of role-based access control or attribute-based access control. The subset of the plurality of user attributes may conform to a presentation policy specifying attributes required to be disclosed for a specified message type. The zero-knowledge proof may further establish that the subset of the plurality of user attributes comprises attributes in the certificate without revealing the plurality of user attributes in the certificate.

According to various examples, a computer system for providing to a user an anonymous user signature on a message in a distributed decentralized network is presented. The computer system includes: at least one hardware security module communicatively coupled to the network and a certificate authority communicatively coupled to the network. The certificate authority includes at least one electronic processor configured to perform operations including: obtaining a credential for the user, the credential comprising a certificate signed by a root certificate authority on the network, wherein the certificate comprises a user public key and a plurality of user attributes; receiving from the user a request for a signature on the message, wherein the request comprises the message to be signed and an indication of a subset of the plurality of user attributes to be revealed to a recipient; accessing, from the hardware security module, a user secret key corresponding to the user public key in the credential; and providing to the user at least the message signed by the user secret key and a zero-knowledge proof, wherein the zero-knowledge proof establishes that the message is signed by the user secret key corresponding to the user public key in the credential without revealing the plurality of user attributes.

Various optional features of the above examples include the following. The operations may further comprise, prior to the receiving the request for the signature: receiving, by a certificate authority on the network and from the user, a request for an account; and providing, to the user, a user name and a password. The operations may further comprise, prior to the receiving the request for the signature: generating an asymmetric cryptographic key pair for the user, wherein the asymmetric cryptographic key pair consists of the user public key and the user secret key; and installing the user secret key in the hardware security module. The operations may further comprise providing to the user an identification of a memory location of the hardware security module at which the user secret key is stored. The network may include a blockchain network. The message may include a proposed cryptocurrency transaction in the blockchain network. The operations may further include, prior to the receiving the request for the signature: accessing, from the hardware security module, the user secret key; and generating, using the user secret key, the credential for the user. The hardware security module may be protected by at least one of role-based access control or attribute-based access control. The subset of the plurality of user attributes may conform to a presentation policy specifying attributes required to be disclosed for a specified message type. The zero-knowledge proof may further establish that the subset of the plurality of user attributes comprises attributes in the certificate without revealing the plurality of user attributes in the certificate.

BRIEF DESCRIPTION OF THE DRAWINGS

The accompanying drawings, which are incorporated in and constitute a part of this specification, illustrate the present teachings and together with the description, serve to explain the principles of the disclosure.

It should be noted that some details of the figures have been simplified and are drawn to facilitate understanding of the present teachings, rather than to maintain strict structural accuracy, detail, and scale.

DETAILED DESCRIPTION

Reference will now be made in detail to the disclosed examples, which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific examples. These examples are described in sufficient detail to enable those skilled in the art to practice them and it is to be understood that other examples can be utilized and that changes can be made without departing from the scope of the disclosure. The following description is, therefore, merely exemplary.

For purposes of comparison, an overview of how prior art blockchain networks typically handle transaction requests is described presently. A participant in the blockchain network, e.g., a human user, using a blockchain client, e.g., a blockchain wallet or other interface, stores their private key locally. A certificate, signed by a certificate authority (CA), and associating the user's public key with certain user attributes, e.g., user name, organization, client location, etc., is available to other participants in the network. The user, via their blockchain client, signs a transaction request (e.g., a request for a transfer of cryptocurrency) and submits it to the blockchain network. The request includes the user's signature on the request. In the blockchain network, certain nodes (e.g., peers) perform validation of the request. The specific nodes (e.g., the number of nodes) that are supposed to validate the transaction depends on the endorsement policy configured in the blockchain network. The validators check if the transaction initiator (the requesting user via the client) is authorized to perform the transaction, which includes validating the signature on the transaction request using the user's publicly available public key, which may be obtained from, or confirmed using, the user's publicly available certificate. Note that as part of this action, the validators may decrypt the certificate or otherwise view the user's attributes that are present in the certificate. Once the transaction is validated, the validators simulate the transaction on the local copy of the blockchain ledger. If all validations are successful, then the validator signs the response with its own private key and returns it to the requesting client. The user's client then validates the signatures received from the validators. When the required number of validator signatures are received (the number depends on the endorsement policy), the request is propagated to the entire network to update the blockchain distributed ledger.

Note that, as described above, all blockchain network participants have access to the certificates of all other users in the blockchain network. The certificates include all the users' attributes that were specified at the time of certificate generation. Anyone can view all the information available in the certificate. Because blockchain network users store their private keys locally, if a malicious person can somehow manage to access the environment of any participant, such a person can access the private key of that user. Thus, information gained from the certificate of a user, e.g., organization name, country, user email address, user legal name, etc., can lead to the knowledge of existence of other users in the network and increase the risk. For example, a business may share a blockchain network with multiple vendors. In this scenario, though the vendors do not need to know about each other, by virtue of being part of the same network, they can gain information about each other through the certificates. While some blockchain networks have mechanism to isolate non-participating members from some transactions, members participating in multiple transaction still have to disclose all details of their certificate attributes. Thus, blockchain networks undesirably leak participant information through the participants' certificates.

Examples solve the above-described private key security and information leakage problems. In particular, some examples provide private key storage and security, e.g., in a distributed and decentralized computer network such as a blockchain. Some examples utilize a hardware security module to store, and in some instances create, private keys securely. Some examples secure communications with the hardware security module using Attribute-Based Access Control ("ABAC") and/or Role-Based Access Control ("RBAC").

Moreover, some examples secure information associated with private keys using a zero-knowledge proof. Zero-knowledge proofs in general are encryption schemes used to prove that that an entity has possession of certain information without revealing the information. Some examples utilize a zero-knowledge proof to establish that a user has a certificate, signed by a certificate authority, that includes certain attributes, without revealing the entirety of attributes in the certificate. In particular, some examples use zero-knowledge proofs to bind user attributes to their public keys without leaking user identities or other user attributes considered private.

In sum, examples provide techniques to secure private keys in decentralized distributed systems such as blockchain networks. Examples keep user identities and associated attributes anonymous, thus, users do not have to expose their identities or their entire set of attributes in their certificate to sign a message such as a transaction request, and a receiving party may verify the user's signature on the message without learning the user's identity or full set of attributes.

These and other features and advantages are shown and described presently in reference to FIGS. 1-4.

Figure 1:
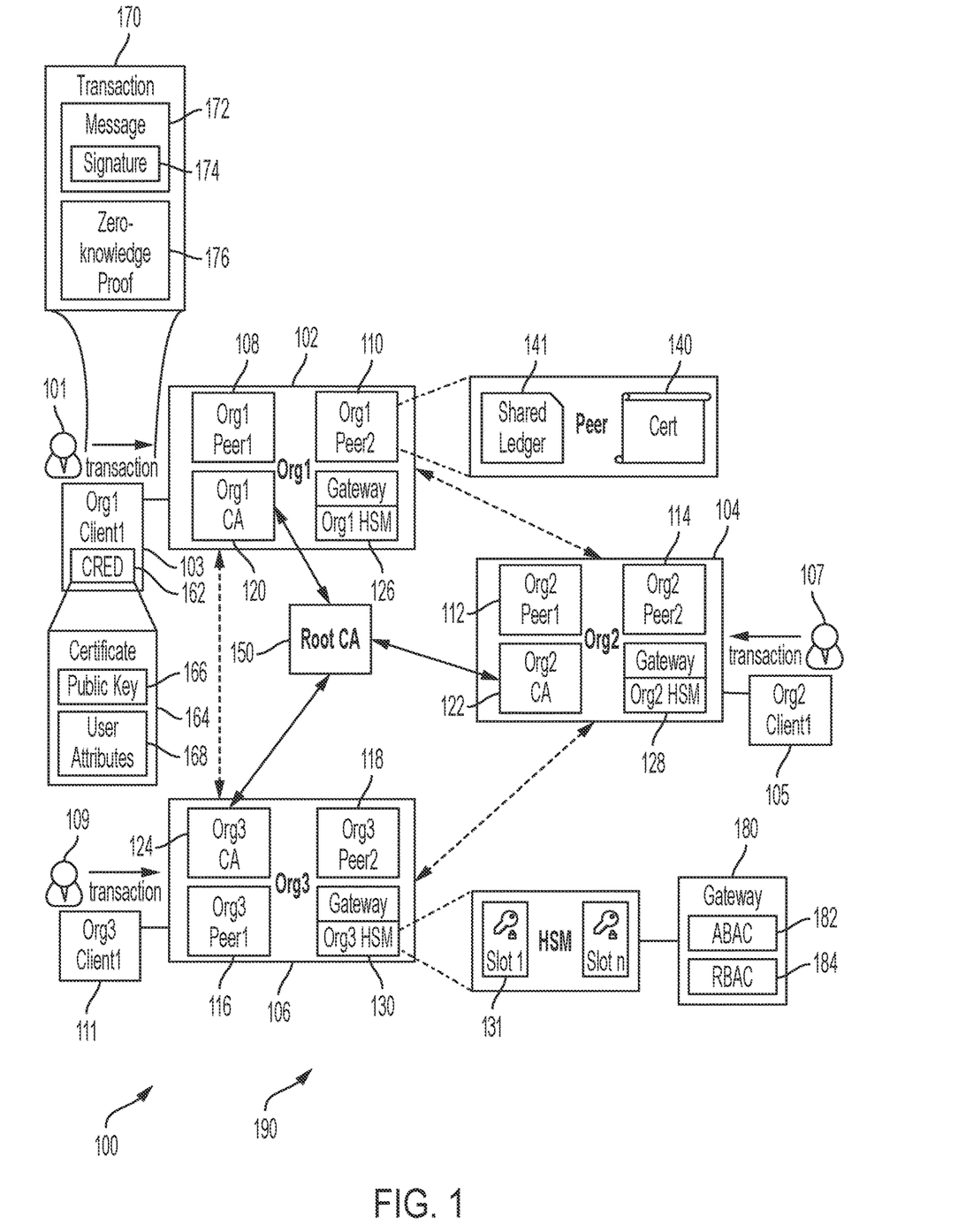
FIG. 1 is a schematic diagram of a distributed decentralized computer network according to an example.

FIG. 1 is a schematic diagram of a distributed decentralized computer network 100 according to an example. Network 100 may be a blockchain network according to some examples. Network 100 includes three organizations 102, 104, 106. Each organization 102, 104, 106 is shown as including two peers, 108, 110, 112, 114, 116, 118, respectively, and a certificate authority 120, 122, 124, respectively. Nodes in the network, including clients 103, 105, 111, peers 108, 110, 112, 114, 116, 118, and certificate authorities 120, 122, 124, 150 may communicate with each other using remote procedure call ("RPC") protocol. In general, peers 108, 110, 112, 114, 116, 118 receive, verify, and process transaction requests. Each peer 108, 110, 112, 114, 116, 118 stores a copy of the shared ledger of the blockchain network (e.g., shared ledger 141 of peer 110) and its own certificate (e.g., certificate 140 of peer 110), which may be in the form of a credential, discussed in detail below.

The interconnected nodes of each organization 102, 104, 106 represent distinct trust domains; that is, each organization 102, 104, 106 represents a trust domain. Each certificate authority 102, 122, 124 is linked to a trusted root certificate authority 150 by a trust link, e.g., by the root certificate authority 150 signing public key certificates for the public keys of the certificate authorities 120, 122, 124 or by the root certificate authority 150 issuing credentials (discussed in detail below) to certificate authorities 120, 122, 124. Thus, certificate authorities 120, 122, 124 are local, intermediate certificate authorities, operating under the authority of root certificate authority 150. All users within organization 102 (respectively, 104, 106) send cryptographic-related requests to their local certificate authority 120 (respectively, 122, 124). Certificate authorities may be implemented as Membership Service Providers ("MSP") in examples built using Hyperledger Fabric.

Users 101, 107, 109, operating their respective clients 103, 105, 111, interact with their respective organization's peers. In particular, users 101, 107, 109 use their client software 103, 105, 111, respectively, to submit their transaction requests to the peers in their network, which validate and endorse the transaction request.

Each organization includes a respective Hardware Security Module ("HSM") 126, 128, 130 in its network. In general, an HSM is a physical tamper-resistant and/or tamper-evident computing device that stores cryptographic keys and performs cryptographic functions such as encryption, decryption, signing, and signature verification. According to some examples, the private keys of users 101, 107, 109 are stored in the respective HSM 126, 128, 130 for their organization. For example, the private key of user 109 may be stored in HSM 130 at memory location 131, which may correspond to a slot, label, and/or index. Some examples utilize the Transport Layer Security ("TLS") protocol with PKCS11 API commands to communication with the HSM 126, 128, 130.

Memory locations 131 and their access within an HSM may be defined by parameters for a "label", an "index", a "module", and a "PIN". The "label" defines the name of the object or the token that will be set. Thus, the label may be considered as a name for the slot. In general, for an HSM, there is no native descriptive identification for slots, so adding a name makes it more manageable. The "index" refers to the position of the slot. This is a numeric representation, starting from one. Different implementations may have different numbering formats. The "module" refers to the relevant library of commands. By default, every HSM includes an implementation of a PKCS11 interface. In case any other library is needed, it may be invoked using a module option. As an example, for the SoftHSM simulator, libraries libsofthsm2 and coolkey may be used. The "PIN" refers to a password to access the content of the slot. This is set at the time of initializing the slot. The PIN is issued to the user or other party that is to access the slot contents.

HSM 126, 128, 130 may be implemented locally or in the cloud. For local implementation, some examples utilize an HSM plugin for the blockchain architecture, which may be Hyperledger Fabric, for example. Some plugins store HSM slot locations in a locally stored Blockchain Cryptographic Service Provider ("BCCSP") setting configuration file. Therefore, if a malicious node gains access to that machine/node, it can gain knowledge of the HSM slot in which a user's key is stored. Local HSMs are very costly and many organizations look for alternative options.

Therefore, organizations may opt for shared HSMs on the cloud (e.g., Key Vault of Microsoft Azure Cloud). The cloud providers may render a service endpoint to the organizations with a subscription. The organizations configure the service endpoint in some customized way such that the nodes on the network can use it. In particular, the service endpoint may include an interpreter to convert communications with the HSMs between gRPC (as used by the nodes) and PKCS11 (as used by the HSM) format. Such an interpreter may be referred to herein as a "gateway". FIG. 1 depicts gateway 180 for HSM 130; HSMs 126, 128 may have their own respective gateways.

To tighten the security of the gateway to HSM 130, some examples utilize Attribute-Based Access Control ("ABAC") 182 and/or Role-Based Access Control ("RBAC") 184 instead of or in addition to standard authentication. RBAC 184 in gateway 180 restricts access to HSM 130 based on a user's role within an organization. More particularly, a person's computer account within the organization may be assigned one or more roles, which are used to determine which network resources, such as HSM 130, the user may access. If a particular network resource is accessible by users with a particular assigned role in the organization, and if a particular user is assigned that role, then the particular user may access the particular network resource.

ABAC 182 restricts network resource access based on attributes assigned to users within an organization. More particularly, ABAC 182 grants usage rights to users through the use of policies that bundle one or more attributes. The policies can use any type of attributes (user attributes, resource attributes, object, environment attributes, etc.). ABAC 182 supports Boolean logic, e.g., ABAC rules may contain IF/THEN conditional statements about who is making the request, the resource, and the action. Unlike RBAC 184, which employs pre-defined roles that carry a specific set of privileges associated with them and to which user accounts are assigned, ABAC 182 can use policies that express a Boolean rule set that can evaluate many different user attributes for access purposes.

An example system 190 may include at least one certificate authority (120, 122, 124) and at least one HSM (126, 128, 130). System 190 may be used to mask or omit the blockchain participants' attributes from their transaction requests, such that no other participant will know who initiates the transactions and what attributes they might have, e.g., the organization name, the email address, which department of which organization the user belongs to, etc. This may be accomplished using a zero-knowledge proof. Using a zero-knowledge proof as disclosed, the validators will not know who is initiating the transaction and would only be able to learn the specific attributes that the transaction initiator decides to disclose.

An overview of how system 190 may be used to implement an example that achieves such attribute hiding is described presently. The example may be implemented, e.g., using Hyperledger Fabric and its component Identity Mixer ("Idemix"). User 101, via their client 103, sends a request to the organization's internal certificate authority 120 for key pair generation. Once the key pair are generated, user 101 sends a request for a credential 162, which may be or include a certificate 164 such as an Enrollment Certificate ("ECert"). Certificate authority 120 accesses the user's private key in the HSM 126 and then generates and issues a credential, e.g., in the form of an Idemix ECert. The credential 162 contains the public key 166 of user 101 and the attributes 168 that user 101 has. User 101 may store credential 162 locally, e.g., in client 103. Then, when user 101 wants to sign a transaction request, they send a request to certificate authority 120 to provide a signature 174 on a message 172 (e.g., the contents of the transaction) using the private key of user 101 and to provide a corresponding zero-knowledge proof 176. The signature and zero-knowledge proof may be in the form of a transaction certificate, such as an Idemix Transaction Certificate ("TCert"). According to some examples that utilize Idemix, the transaction certificate includes a zero-knowledge proof, which: (1) signs the transaction content, (2) proves a possession of a valid ECert issued by a certificate authority without revealing the full set of user attributes in the ECert, and (3) discloses only the attributes that are required by the presentation policy for the network. The ultimate issuer of the ECert and the TCert in this hierarchy may be the root certificate authority 150.

In response to the request of user 101, the local certificate authority 120 generates a TCert request that contains only the attributes that are disclosed by user 101 consistent with the network's presentation policy. The Idemix engine running in local certificate authority 120 generates a TCert, signed by root certificate authority 150. User 101 then issues a transaction request and signs the transaction request using the TCert, that is, by including the TCert in the transaction request.

The transaction request with its TCert then reaches the verifier(s) in the network. The verifiers verify the transaction using the public key of root certificate authority 150. This may be performed by the Idemix Membership Service Provider ("MSP") of the verifier. The verifiers are all the nodes (e.g., peers 108, 110) that are specified as part of the endorsement policy for the network, and the signature gets verified using the Idemix MSP of all verifiers. In this process, the verifiers determine that the transaction and its initiator are valid and using the public key of root certificate authority 150. However, since the TCert is created with limited information, it can maintain anonymity.

Note that Idemix is capable of generating multiple TCerts with different presentation policies. Therefore, in an isolated environment, one participant can use a different TCert for every transaction (or every vendor). The zero-knowledge proof of Idemix provides unlinkability and anonymity in the network. Linking of the user 101 and TCert only can be done through the root certificate authority 150.

The above summary and its variations are elaborated upon in the following descriptions regarding FIGS. 2-4.

Figure 2:
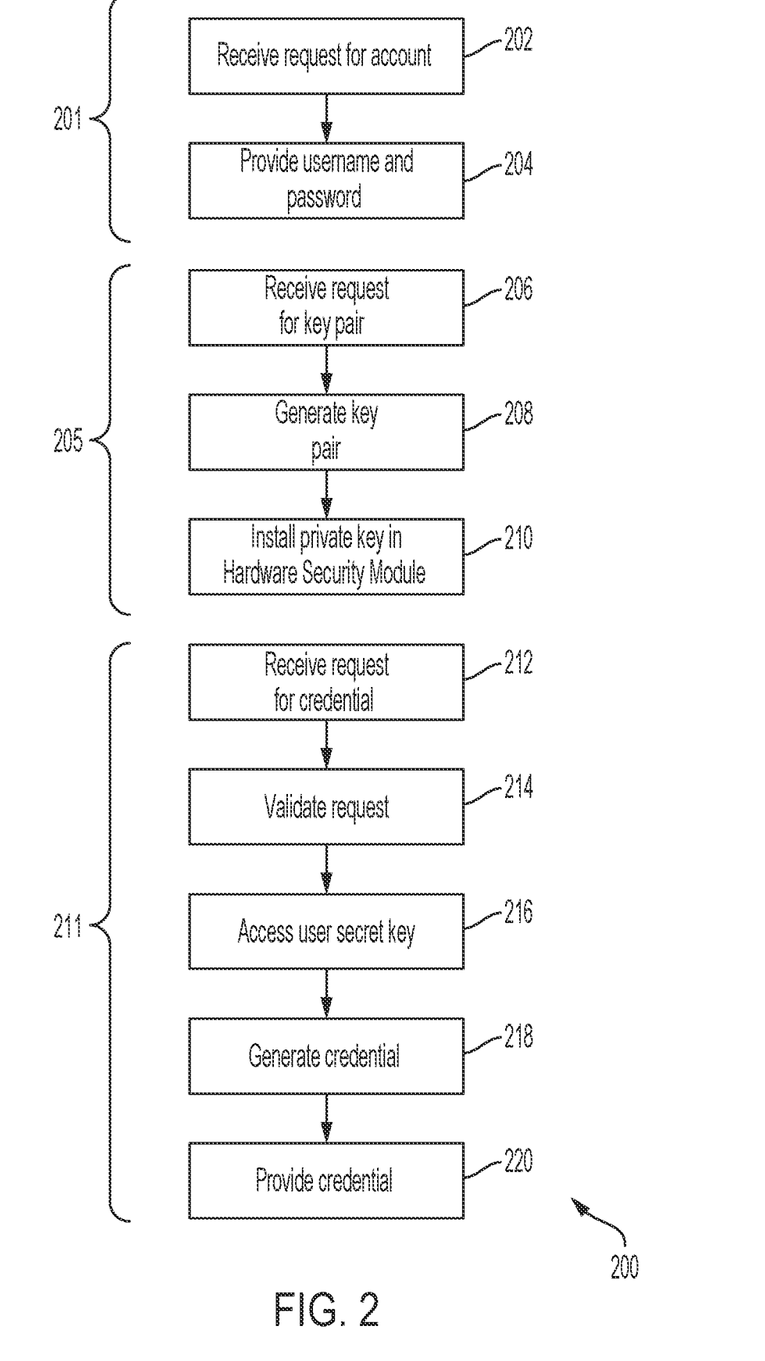
FIG. 2 depicts flowcharts of methods for preparing for a certificate authority to provide to a user an anonymous user signature on a message in a distributed decentralized network according to an example.

FIG. 2 depicts flowcharts of methods 200, namely, methods 201, 205, and 211, for preparing for a certificate authority to provide to a user an anonymous user signature on a message in a distributed decentralized network according to an example. That is, methods 201, 205, 211 may be used to provision a system to later provide an anonymous signature as shown and described in reference to FIG. 3. Methods 201, 205, and 211 may be implemented using system 190 of FIG. 1, for example.

Method 201 may be used by a user to establish an account with the distributed decentralized network (e.g., a blockchain). At 202, a certificate authority (e.g., local certificate authority 120, 122, 124) receives a request from a user (e.g., user 101) via their client (e.g., client 103) for an account. According to some examples, the request may be generated through a command line interface to a Hyperledger Fabric certificate authority. The user provides at least some of their attributes and is registered with the certificate authority, e.g., an MSP. The command may be of the following form, by way of non-limiting example:

fabric-ca-client register --id.name $USERNAME --id.type user --id.affiliation org1.department1 --id.attrs 'hf.Revoker=true,foo=bar'

Note that additional attributes for the user can be added to an ECert (discussed below) by adding an ":ecert" field, as follows.

fabric-ca-client register -u . . . -id.attrs <attrName>=<attrValue>[:ecert]

The registration command returns a password after registering the user.

At 204, the user provides a username and receives a corresponding password from the certificate authority. According to some examples, the certificate authority provides both the username and password.

The certificate authority may further enroll the user as part of method 201. Such enrollment may be accomplished using the following command, by way of non-limiting example.

fabric-ca-client enroll -u http://$USERNAME:PASSWORD@$HOST:$PORT -M $FABRIC_CA_CLIENT_HOME/${USERNAME}msp Note that the enroll command includes the username and password for the user.

Method 205 may be used by a user to request that an asymmetric key pair be generated and managed for the user. At 206, a request to generate an asymmetric key pair is received, e.g., by an MSP, a gateway, or another interface to the HSM. There are two main examples of method 205: (1) create the key pair and store the private key internally to the HSM, and (2) create the key pair and load the private key into the HSM programmatically.

To create the key pair externally and import the secret key to the HSM, various techniques may be used. For example, openssl may be used to generate 208 the key pair, and softhsm2-util may be used to install 210 the private key in a slot of SoftHSM that simulates an HSM. An import command may be of the form of, by way of non-limiting example:

softhsm2-util --import $SECRET_KEY --serial $SLOT_SERIAL --id $SLOT_ID --label $SLOT_LABEL To create the key pair and load the private key programmatically, customized coding may be used. For example, Java code may be used to create a SoftHSM client, generate 208 a key pair in memory, and install 210 the private key in SoftHSM. The slot is initiated before the key can be stored. An example initiation command is, by way of non-limiting example, as follows:

softhsm2-util --init-token --slot 0 --label $LABEL

This command initializes an available slot for key storage. At the time of import, the slot ID needs to be supplied. An example import command is, by way of non-limiting example, as follows:

softhsm2-util --import $SECRET_KEY --serial $SLOT_SERIAL --id $SLOT_ID --label $SLOT_LABEL According to either technique (internal key creation, programmatic key creation), the HSM itself may not associate a slot with a user. However, examples may use custom code external to the HSM to establish the mapping of users and slots, e.g., using a gateway as shown and described above in reference to FIG. 1.

Method 211 may be used by a user to obtain a credential, e.g., an ECert. At 212, the user's (e.g., user 101) local certificate authority (e.g., certificate authority 120) receives a request for a credential for user. The credential request may include a set of attributes of user 101, or such attributes may already be known to the certificate authority via the user's account establishment using, e.g., method 201. The credential request may also include the user's 101 public key. The credential request may also include a zero-knowledge proof that user 101 has possession of the secret key corresponding to the provided public key.

At 214, certificate authority 120 verifies the zero-knowledge proof that user 101 has possession of the secret key corresponding to the public key included in the request. Note that certificate authority 120 does not learn of the user's secret key through the verification. If the zero-knowledge proof is validated, then control passes to 216; otherwise, the process halts with an error.

At 216, the certificate authority accesses the secret key of user 101. The certificate authority may obtain the secret key from an HSM according to some examples.

At 218, the certificate authority generates a credential for user 101. The credential may include the user's public key and a list of the user's attributes, and may be signed by a certificate authority, e.g., a root certificate authority such as root certificate authority 150 of FIG. 1. The credential may be in the form of an Idemix ECert according to some examples.

At 220, the certificate authority provides to user 101 the credential. The certificate authority may provide the credential to user 101 via communication channels of network 100. User 101 may store their credential locally for future use.

Figure 3:
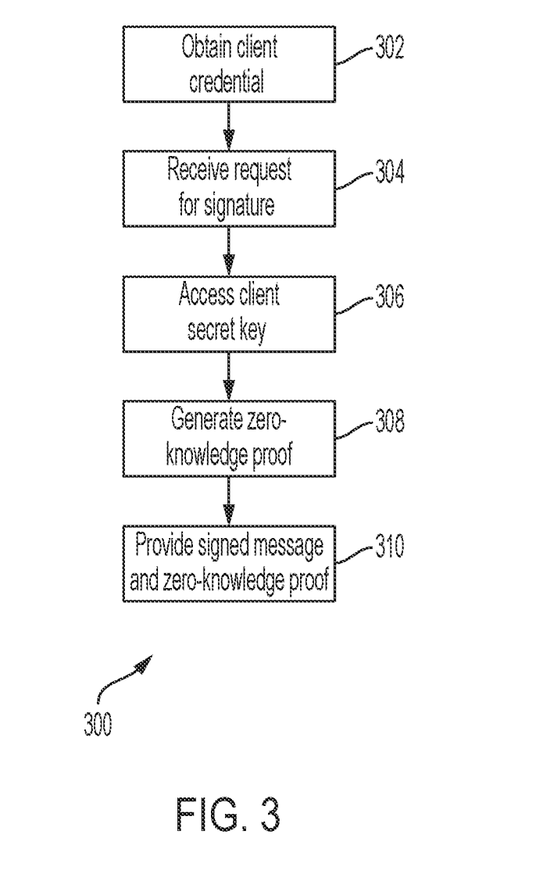
FIG. 3 is a flowchart of a method for a certificate authority to provide to a user an anonymous user signature on a message in a distributed decentralized network according to an example.

FIG. 3 is a flowchart of a method 300 for a certificate authority to provide to a user an anonymous user signature on a message in a distributed decentralized network according to an example. Method 300 may be implemented using system 190 of FIG. 1, for example.

At 302, a certificate authority (e.g., certificate authority 120 for purposes of illustrating method 300) obtains a user credential (e.g., a credential of user 101). Certificate authority 120 may obtain the credential from a stored collection of such credentials, or the credential may be supplied in a request from the user.

At 304, certificate authority 120 receives a request for a signature from user 101 via client 103. The request may include the data to be signed (e.g., a message such as a blockchain transaction request), the user's credential, e.g., as provided per method 211 (according to some examples; in other examples, certificate authority obtains the user's credential elsewhere, e.g., from local storage), a list of user attributes that user 101 is willing to reveal (a subset of the attributes in the user's credential), and the public key of root certificate authority 150 (according to some examples; in other examples, certificate authority obtains the root certificate authority's public key elsewhere, e.g., from local storage).

At 306, certificate authority 120 accesses the secret key of user 101. Certificate authority 120 may obtain the secret key from HSM 126 according to some examples.

At 308, certificate authority 120 generates at least one zero-knowledge proof. In particular, certificate authority 120 uses the secret key, the list of attributes that user 101 is willing to reveal, the secret key of root certificate authority 150, and the credential of user 101 obtained per method 211 to generate a data structure that includes the data to be signed, signed by the secret key of user 101, and at least one zero-knowledge proof. At least one zero-knowledge proof in the data structure may establish that the message is signed by the user secret key corresponding to the user public key in the credential without revealing the full plurality of attributes that are present in the credential of user 101. At least one zero-knowledge proof in the data structure may establish that the list of attributes that user 101 is willing to reveal is included in the full list of attributes in the credential of user 101 without revealing full plurality of user attributes that are present in the credential of user 101. At least one zero-knowledge proof in the data structure may establish a trust chain exists from the signature on the data for which a signature was requested to the public key of the root certificate authority 150. The signature and/or one or more zero-knowledge proofs generated per 208 may include a signature as disclosed by any of: C. F. Schnorr, *Efficient Identification and Signatures for Smart Cards*, Advances in Cryptology—CRYPTO '89, LNCS 435, pp. 239-252, 1990; Camenisch J., Lysyanskaya A., Signature Schemes and Anonymous Credentials from Bilinear Maps, Franklin M. (eds) Advances in Cryptology—CRYPTO 2004, Springer 2004; and Au M. H., Susilo W., Mu Y., *Constant-Size Dynamic k-TAA*, De Prisco R., Yung M. (eds) Security and Cryptography for Networks, Springer 2006. According to some examples, the signature and/or one or more zero-knowledge proofs may include an Idem ix signature. When the data to be signed includes a request for a blockchain transaction in a Hyperledger Fabric implementation, the data structure generated per 208 may be referred to as a transaction certificate, or TCert.

At 310, certificate authority 120 provides to user 101 the signed message and at least one zero-knowledge proof, which may be included in a data structure that also includes the signed data for which a signature was requested. According to some examples, the full data structure is provided to user 101.

Figure 4:
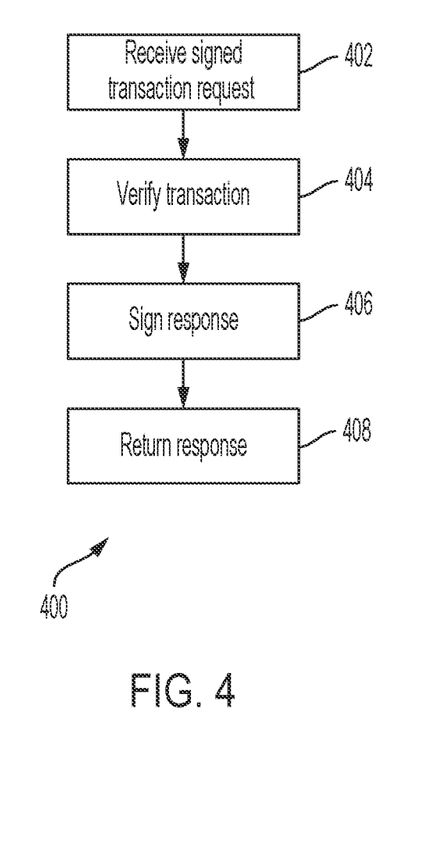
FIG. 4 is a flowchart of a method for a recipient utilizing a signature on a message according to an example.

FIG. 4 is a flowchart of a method 400 for a recipient utilizing a signature on a message according to an example. Method 400 may be implemented using system 190 of FIG. 1, for example. By way of non-limiting example, method 400 is disclosed in the context of user 101 requesting that their cryptocurrency transaction 170 be endorsed by a required number of peers.

At 402, a peer, such as peer 108, receives a signed transaction request from client 103. The transaction request includes a description of the transaction (e.g., transfer X amount of cryptocurrency units to blockchain network participant Y) and a transaction certificate as shown and disclosed herein in reference to method 300. In particular, the transaction certificate may include the signed transaction description and at least one zero-knowledge proof as shown and described above in reference method 300.

At 404, peer 108 verifies the transaction. That may include verifying some or all verifiable information in the transaction certificate. For example, 404 may include peer 108 confirming that the transaction request is signed by the user secret key corresponding to the user public key in the credential for user 101 without obtaining the plurality of user attributes. Alternately, or in addition, 404 may include peer 108 confirming that the list of attributes that user 101 is willing to reveal is included in the full list of attributes in the credential of user 101 without revealing full plurality of user attributes that are present in the credential of user 101. Alternately, or in addition, 404 may include peer 108 confirming that a trust chain exists from the signature on the data for which a signature was requested to the public key of the root certificate authority 150. If all verifications are completed without error, then control passes to 406; otherwise, method 400 may halt with an error.

At 406, peer 108 signs a response to the transaction request, indicating that peer 108 endorses the proposed transaction. The signature may be a signature as shown and disclosed herein in reference to FIG. 3.

At 408, peer 108 sends the signed response to client 103.

Subsequently, once client 103 has received a sufficient number of peer endorsements (per an endorsement policy) such as that sent by peer 108 at 408, client 103 broadcasts the fully endorsed transaction to the blockchain network or to dedicated nodes (e.g., ordering nodes) according to various examples. The nodes in the blockchain network receive the endorsed transaction and verify all signatures from the endorsing peers. Upon successful validation, the nodes update their local copy of the blockchain ledger.

The subject disclosure is not to be limited in terms of the particular examples described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The subject disclosure is to be limited only by the terms of the appended claims, along with the full scope of equivalents to which such claims are entitled. It is also to be understood that the terminology used herein is for the purpose of describing particular examples only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations can be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims can contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. A method of a certificate authority providing to a user an anonymous user signature on a message in a distributed decentralized network, the method comprising:
   obtaining, by the certificate authority, a credential for the user, the credential comprising a certificate signed by a root certificate authority on the network, wherein the certificate comprises a user public key and a plurality of user attributes;
   receiving, by the certificate authority on the network and from the user, a request for a signature on the message, wherein the request comprises the message to be signed, and wherein the request comprises an indication of a subset of the plurality of user attributes to be revealed to a recipient;
   accessing, from a hardware security module on the network, a user secret key corresponding to the user public key in the credential; and
   providing, by the certificate authority and to the user, at least the message signed by the user secret key and a zero-knowledge proof, wherein the zero-knowledge proof establishes that the message is signed by the user secret key corresponding to the user public key in the credential without revealing the plurality of user attributes,
   whereby the user sends the subset of user attributes, the zero-knowledge proof, and the message signed by the user secret key corresponding to the user pubic key in the credential to the recipient, who confirms at least that the message is signed by the user secret key corresponding to the user public key in the credential without obtaining the plurality of user attributes.

2. The method of claim 1, further comprising, prior to the receiving the request for the signature:
   receiving, by the certificate authority on the network and from the user, a request for an account; and
   providing, to the user, a user name and a password.

3. The method of claim 1, further comprising, prior to the receiving the request for the signature:
   generating an asymmetric cryptographic key pair for the user, wherein the asymmetric cryptographic key pair consists of the user public key and the user secret key; and
   installing the user secret key in the hardware security module.

4. The method of claim 3, further comprising providing to the user an identification of a memory location of the hardware security module at which the user secret key is stored.

5. The method of claim 1, wherein the network comprises a blockchain network.

6. The method of claim 5, wherein the message comprises a proposed cryptocurrency transaction in the blockchain network.

7. The method of claim 1, further comprising, prior to the receiving the request for the signature:
   accessing, from the hardware security module, the user secret key; and
   generating, using the user secret key, the credential for the user.

8. The method of claim 1, wherein the hardware security module is protected by at least one of role-based access control or attribute-based access control.

9. The method of claim 1, wherein the subset of the plurality of user attributes conforms to a presentation policy specifying attributes required to be disclosed for a specified message type.

10. The method of claim 1, wherein the zero-knowledge proof further establishes that the subset of the plurality of user attributes comprises attributes in the certificate without revealing the plurality of user attributes in the certificate.

11. A computer system for providing to a user an anonymous user signature on a message in a distributed decentralized network, the computer system comprising:
   at least one hardware security module communicatively coupled to the network; and
   a certificate authority communicatively coupled to the network, the certificate authority comprising at least one electronic processor configured to perform operations comprising:
      obtaining a credential for the user, the credential comprising a certificate signed by a root certificate authority on the network, wherein the certificate comprises a user public key and a plurality of user attributes;
      receiving from the user a request for a signature on the message, wherein the request comprises the message to be signed, and wherein the request comprises an indication of a subset of the plurality of user attributes to be revealed to a recipient;
      accessing, from the hardware security module, a user secret key corresponding to the user public key in the credential; and
      providing to the user at least the message signed by the user secret key and a zero-knowledge proof, wherein the zero-knowledge proof establishes that the message is signed by the user secret key corresponding to the user public key in the credential without revealing the plurality of user attributes.

12. The computer system of claim 11, wherein the operations further comprise, prior to the receiving the request for the signature:
   receiving, by a certificate authority on the network and from the user, a request for an account; and
   providing, to the user, a user name and a password.

13. The computer system of claim 11, wherein the operations further comprise, prior to the receiving the request for the signature:
   generating an asymmetric cryptographic key pair for the user, wherein the asymmetric cryptographic key pair consists of the user public key and the user secret key; and
   installing the user secret key in the hardware security module.

14. The computer system of claim 13, wherein the operations further comprise providing to the user an identification of a memory location of the hardware security module at which the user secret key is stored.

15. The computer system of claim 11, wherein the network comprises a blockchain network.

16. The computer system of claim 15, wherein the message comprises a proposed cryptocurrency transaction in the blockchain network.

17. The computer system of claim 11, wherein the operations further comprise, prior to the receiving the request for the signature:
   accessing, from the hardware security module, the user secret key; and
   generating, using the user secret key, the credential for the user.

18. The computer system of claim 11, wherein the hardware security module is protected by at least one of role-based access control or attribute-based access control.

19. The computer system of claim 11, wherein the subset of the plurality of user attributes conforms to a presentation policy specifying attributes required to be disclosed for a specified message type.

20. The computer system of claim 11, wherein the zero-knowledge proof further establishes that the subset of the plurality of user attributes comprises attributes in the certificate without revealing the plurality of user attributes in the certificate.

\* \* \* \* \*